June 21, 1960 A. T. BRENNAN 2,942,194

PULSE WIDTH DECODER

Filed Oct. 10, 1956 2 Sheets-Sheet 1

INVENTOR.
ALAN T. BRENNAN

BY

T. L. Styner
ATTORNEY

June 21, 1960 A. T. BRENNAN 2,942,194

PULSE WIDTH DECODER

Filed Oct. 10, 1956 2 Sheets-Sheet 2

INVENTOR.
ALAN T. BRENNAN

BY

T. L. Steyner
ATTORNEY

United States Patent Office 2,942,194

Patented June 21, 1960

2,942,194

PULSE WIDTH DECODER

Alan T. Brennan, Rochester, N.Y., assignor to General Dynamics Corporation, Rochester, N.Y., a corporation of Delaware Filed Oct. 10, 1956, Ser. No. 615,166

7 Claims. (Cl. 328—112)

This invention relates to pulse decoders, and is particularly directed to means for separating voltage pulses according to their widths or durations, as distinguished from amplitude.

Discrimination between long and short pulses has been accomplished in the past by converting the pulse widths functionally into pulse amplitudes and then separating the pulses on the basis of their amplitudes. A more direct approach has been tried in which a single pulse was propagated down a low-loss, open-ended transmission line, usually with lumped inductances and capacitances, the line being of measured electrical length so that the time of arrival of the reflected forward portion of the pulse overlaps the trailing portion of the original pulse, thereby producing a distinctive double-amplitude voltage at the input end of the line. An amplifier connected to the input end of the line will relay the width-selected pulse to any utilization circuit. It will be noted that such a system is analagous to a high pass filter, in that pulses must be longer than a minimum width to be accepted and passed. By analagous techniques, with an inverter stage, pulses of durations greater than a predetermined value can be rejected so that two delay lines and two amplifiers properly cascaded can be made to accept and pass pulses between two limits. Such a discriminator is described in the literature, reference being made particularly to page 186 of volume 3 of the Radiation Laboratory Series by the Massachusetts Institute of Technology, published by McGraw-Hill, 1947.

Unfortunately, such a pulse width discriminator is quite complex, and is capable of removing and isolating pulses of but one width or of a narrow band of widths. It is desirable in multiplexed pulse modulations, for example, to separate a large number of pulses according to their widths.

The object of this invention is to provide an improved pulse discriminator.

A more specific object of this invention is to provide a pulse discriminator which will separate pulses of random widths into any desired number of groups, according to their widths, yet which is simple in construction and reliable in operation.

The objects of this invention are attained by a transmission line of relatively long electrical length, to one end of which is applied the mixed pulses of all widths. At spaced points along the line is tapped the input terminals, respectively, of a like number of amplifiers. The input electrodes of the amplifiers are so statically biased that voltages equal to about twice the incident pulse voltage are required to produce a change in the quiescent state of the amplifiers. The two input electrodes receive the necessary double voltage only when the incident and reflected pulses in the line meet at the taps of one amplifier. The output of each amplifier will contain only pulses of a width corresponding to the electrical distance of the input electrode taps from the end of the line.

Other objects and features of this invention will become apparent by referring to the specific embodiments described in the following specification and shown in the accompanying drawings, in which.

Figure 1:
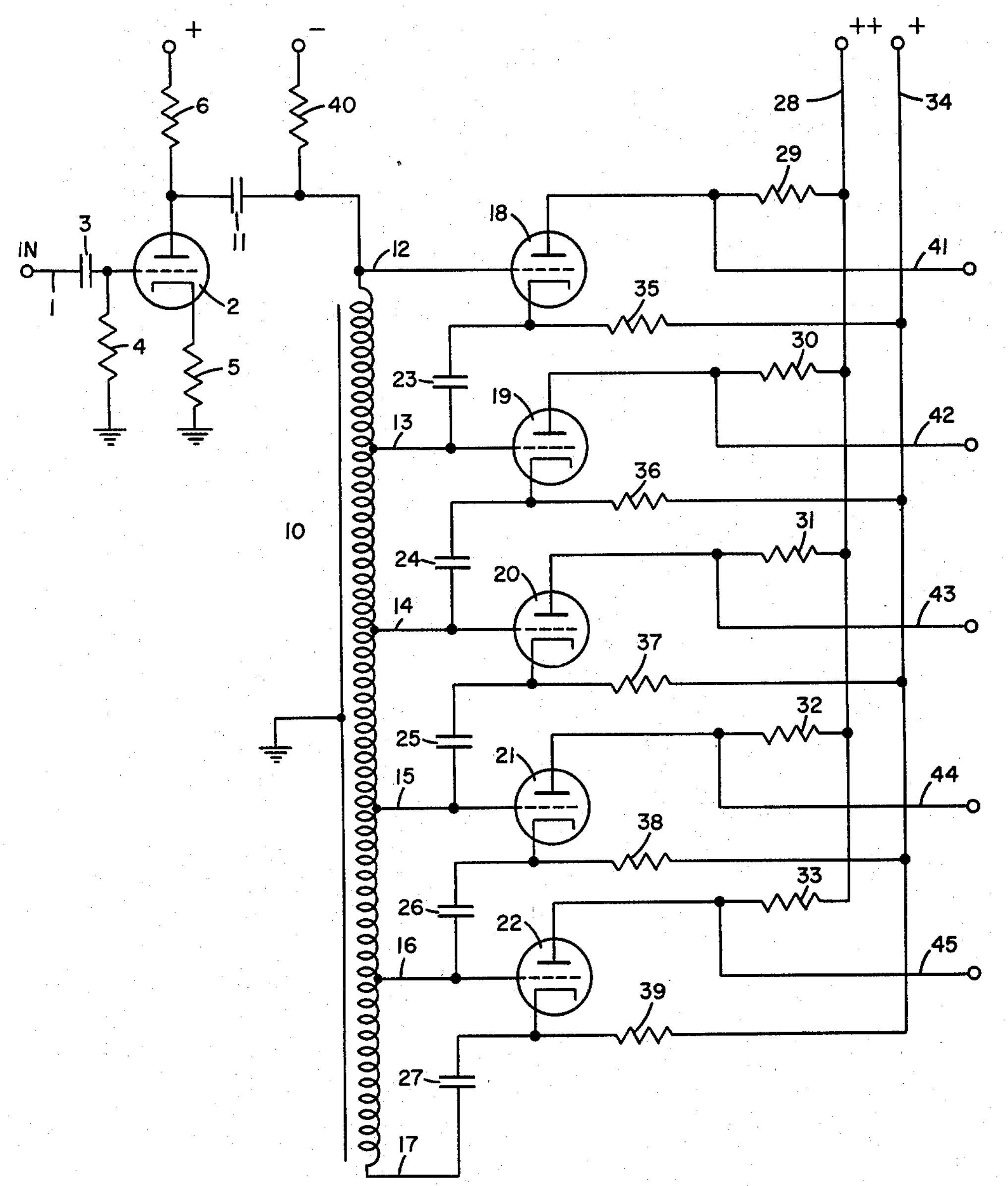
Fig. 1 is a circuit diagram of said embodiment of this invention.

In Fig. 1, terminal 1 is assumed to receive a complex mixture of voltage pulses of random repetition rates, pulse durations and amplitudes. The pulses are all first reduced to a common amplitude by the limiter stage 2. In the particular example shown, the limiter comprises a simple triode, the parameters of which may be so selected that the tube saturates upon receipt of a signal of predetermined minimum amplitude. The triode shown has coupling condenser 3, grid leak resistor 4, cathode resistor 5, and load resistor 6. The amplified signal which in this case is inverted, is applied to one end of the transmission line 10. Coupling is effected by the condenser 11, although other types of coupling schemes could be employed. The transmission line 10 may have any desired electrical length as will hereinafter appear, and may be of the distributed or lumped inductance type, with, preferably, an open end. The transmission line is tapped at a number of spaced points. An arbitrary number of taps may be used, five being shown in the particular embodiment shown in Fig. 1. The taps are numbered 12, 13, 14, 15, 16, and 17, which may be either evenly or unevenly spaced points. For the purposes of this description, evenly spaced taps will be assumed, so that the delay of any wave traveling along the line will arrive at points 12 to 17 at evenly spaced time intervals. If the taps were unevenly spaced, arrival time of a pulse at the taps would be correspondingly uneven.

Figure 2:
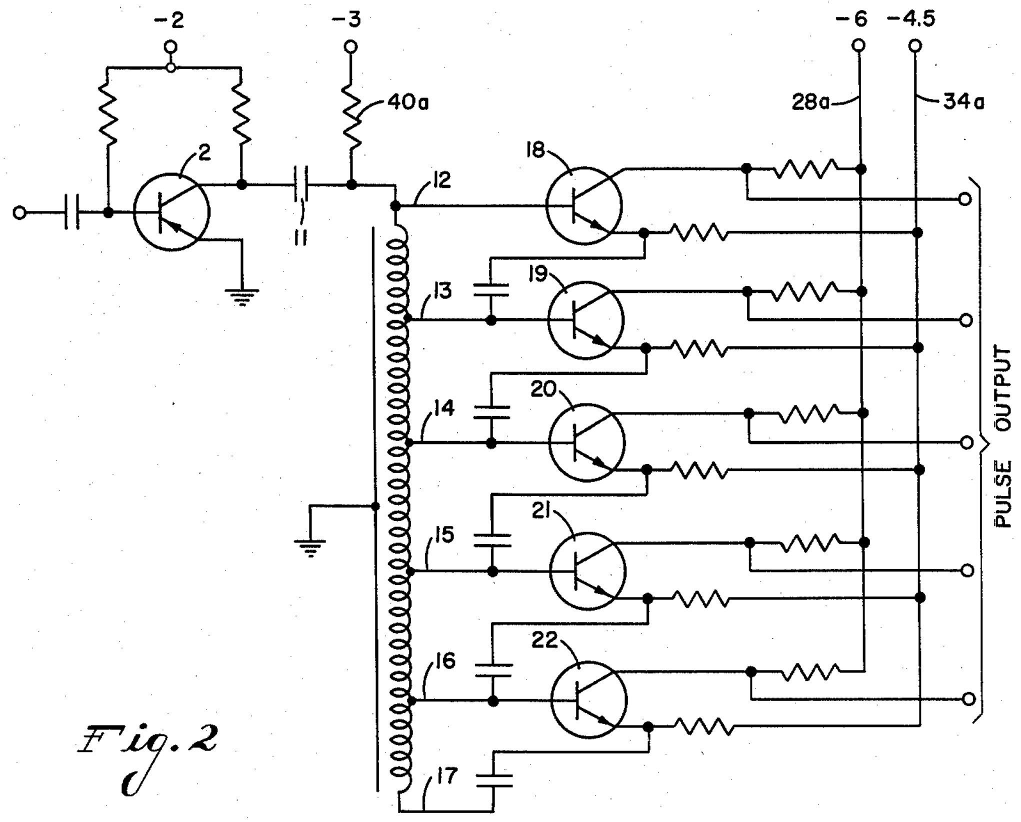
Fig. 2 is another circuit diagram of a similar embodiment of this invention.

According to an important and characteristic feature of this invention, amplifiers 18 to 22, inclusive, each have one input electrode connected respectively to the taps 12 to 17. The particular amplifiers chosen for Fig. 1 are of the electron discharge type, specifically triodes, although tetrodes, pentodes or other types of amplifiers could be used. In fact, transistors have been employed as the amplifying device at 18–22, as shown in Fig. 2. The other input electrode of each amplifier, namely the cathodes in Fig. 1, is close coupled through a blocking condenser to the tap next adjacent the grid tap. The blocking condensers are shown respectively at 23 to 27, inclusive. The anodes are each connected to a suitable voltage source 28 through load resistors 29 to 33, respectively. Each cathode is statically biased in a positive direction with respect to ground by voltage source 34 through cathode resistors 35 to 39, respectively.

The grids of the triodes, on the other hand, are biased by source 40 to a value which is negative with respect to the cathode and to a value which will normally block conduction through the tubes. This grid-cathode bias is greater than the amplitude of any signal pulse which may be passed by the limiter 2. The bias, however, is less than twice the limited signal value, so that the grid-cathodes of the amplifiers must be driven by voltages approaching twice the limiting voltage to produce a signal in the output circuits of the amplifiers. As will appear, pulse signals will appear at the output terminals 41 to 45, respectively, each output containing only pulses of a width corresponding to the electrical distance of the input taps 12 to 17 from the terminal of the transmission line.

In operation, a pulse received at terminal 1 is fixed in amplitude by the limiter 2 and applied to the input end of the line. The pulse proceeds along the line to its end, and is reflected back toward the input end. The incident and reflected wave will meet intermediate the ends of the line, and will overlap for a time depending upon the length or duration of the pulse. For amplifier 20, for example, to be unblocked, the grid of tap 14 must be driven in a positive direction, and/or the cathode, coupled to tap 15, must be driven in a negative direction. That is, the grid of 20 must move positively two units of voltage with reference to the cathode of 20 to produce an output signal at terminal 43. Or, the grid of one amplifier must be driven positively one unit of voltage while the cathode is driven negatively one unit of voltage. Only a signal of a duration corresponding to the electrical distance from tap 14 to the end 17 can activate amplifier 20. Signals of greater length will produce coincidence of the incident and reflected wave at tap 15, will raise the cathode of amplifier 20 an amount equal to the rise of the grid potential, and will produce no change in conductance of amplifier 20. The same comments may be made about each amplifier.

Figure 3:
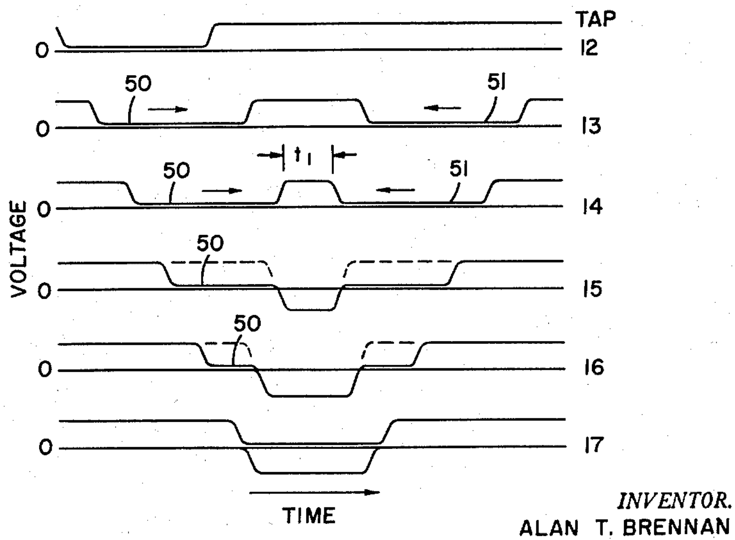
Fig. 3 is a time scale graph of incident and reflected pulses on a transmission line of this invention.

In Fig. 3, a series of graphs are shown to illustrate the relative positions of a pulse of 5 microseconds' duration at the several taps 12 to 17. If the transmission line is of such a length as to produce a 5 microsecond delay, the various positions of the pulse will occur at the several taps as shown. At tap 14, for example, the incident wave 50 and reflected wave 51 have not met but are spaced apart by the distance $t_1$. The grid of amplifier 20 connected to tap 14 accordingly is not changed. At tap 15, however, the incident and reflected waves have overlapped, driving the cathode of amplifier 20 two units of voltage in a negative direction with respect to the grid, and will thus overcome the static grid and cathode bias and will thus produce conduction and a signal at terminal 43. It will be noted, however, that taps 15 and 16, connected to the input of the next adjacent amplifier 21, drive the grid and cathode of 21 in the same direction potential-wise, and are unaffected by the 5 microsecond pulse. Shortest pulses only will pass amplifier 22, while the longest pulse only will be accepted and passed by amplifier 18.

In Fig. 2, transistors have been substituted for the triodes of Fig. 1, like reference characters in the two figures identifying corresponding elements. The NPN type transistors have been assumed with the bases connected to the taps and the emitters connected in circuit like the cathodes, while the collectors have been connected like the anodes. The bases are biased by source 40*a* to a less negative value than the emitters. The two biases prevent conduction through the collector circuits unless the bases are forced positively two units of voltage with respect to the emitter voltage. Each emitter is connected to a tap next adjacent the tap connected to its base, so that the operation is analogous to that of the amplifiers of Fig. 1. In the particular transistor embodiment shown, the bases are biased to −3 volts, while the emitters are biased to −4.5 volts. The invention is, of course, not limited to such specific values.

While a specific embodiment of this invention has been shown and described, other modifications will readily occur to those skilled in the art. It is not, therefore, desired that this invention be limited to the specific arrangement shown and described, and it is intended in the appended claims to cover all modifications within the spirit and scope of this invention.

What is claimed is:

1. A pulse width discriminator comprising a transmission line so terminated at one end as to reflect energy and connected to the other end to a source of pulse energy, a plurality of biased amplifiers, said amplifiers each having two input electrodes, the two input electrodes of each amplifier being connected to spaced points along said line intermediate the ends of said line so that in-phase portions of incident and reflected pulse waves arrive at the spaced points at different times.

2. A pulse width discriminator comprising a transmission line, said line having a plurality of taps spaced along the line, a plurality of amplifiers, each amplifier having two input terminals and an output terminal, said two terminals of each amplifier being connected to different taps, and separate utilization means connected to each output terminal.

3. A pulse discriminator comprising a transmission line having a measured electrical length, said line having a plurality of taps spaced along the line, a plurality of amplifiers, each amplifier having two input terminals and an output terminal, each amplifier having one input terminal connected respectively to one tap, the other input terminal of the amplifier being connected to the next adjacent tap, and separate output circuits connected, respectively, to the output terminals of said amplifiers.

4. The pulse discriminator defined in claim 3, further having two biasing sources connected, respectively, to said two input terminals.

5. The pulse discriminator defined in claim 3, further comprising a signal amplitude limiting device connected to one end of said transmission line.

6. A pulse discriminator system for separating mixed pulses from a source of pulses of various lengths, into separate output circuits, said system comprising a delay transmission line, said line being adapted for connection at one end to said source of pulses and being so terminated at the other end as to reflect all said pulses without inversion; a plurality of amplifiers, each amplifier having a first and a second control electrode and having means for biasing the control electrodes relative to each other to normally cut off current in the output circuit of the amplifier, the first control electrode of said amplifiers being coupled, respectively, to different spaced intermediate points along said line so that said first control electrodes are successively biased toward conduction by each incident pulse, the second control electrode of said amplifiers being coupled, respectively, to spaced intermediate points along said line, the last-mentioned points being displaced toward the terminated end of said line so that said second control electrode is biased toward non-conduction by each reflected pulse.

7. A discriminator for separating pulses of various widths, said discriminator comprising a transmission line for connection at one end to a source of pulses of mixed width and so terminated at the other end as to reflect said pulses toward said one end, a plurality of pulse amplifiers, each amplifier having two control electrodes the relative voltages of which determine conduction in the output of the amplifier, a first control electrode of each amplifier being connected to an intermediate point on said line, the connection points of the plurality of first control electrodes being spaced apart along said line to successively receive incident pulses from source, the other control electrodes of said amplifiers being connected to intermediate points on said line spaced, respectively, from the first-mentioned points so that the two control electrodes of each amplifier are biased by each pulse in a direction to, respectively, cause conduction and non-conduction of said amplifier.

References Cited in the file of this patent

UNITED STATES PATENTS

| | | |
|---|---|---|
| 2,266,154 | Blumlein | Dec. 16, 1941 |
| 2,403,561 | Smith | July 9, 1946 |
| 2,449,819 | Purington | Sept. 21, 1948 |
| 2,511,595 | Loughren | June 13, 1950 |
| 2,536,032 | Clark | Jan. 2, 1951 |
| 2,576,617 | Loughren | Nov. 27, 1951 |
| 2,577,141 | Mauchly et al. | Dec. 4, 1951 |
| 2,631,232 | Baracket | Mar. 10, 1953 |
| 2,635,229 | Gloess et al. | Apr. 14, 1953 |
| 2,670,463 | Raymond | Feb. 23, 1954 |
| 2,706,810 | Jacobsen | Apr. 19, 1955 |
| 2,707,751 | Hance | May 3, 1955 |
| 2,795,775 | Faymoreau et al. | June 11, 1957 |

FOREIGN PATENTS

| | | |
|---|---|---|
| 166,416 | Austria | July 25, 1950 |

UNITED STATES PATENT OFFICE

CERTIFICATE OF CORRECTION

Patent No. 2,942,194 June 21, 1960

Alan T. Brennan

It is hereby certified that error appears in the printed specification of the above numbered patent requiring correction and that the said Letters Patent should read as corrected below.

Column 3, line 65, for "to", first occurrence, read -- at --.

Signed and sealed this 15th day of November 1960.

(SEAL)

Attest:

KARL H. AXLINE

Attesting Officer

ROBERT C. WATSON

Commissioner of Patents